United States Patent

Lewoczko

[11] 3,977,515
[45] Aug. 31, 1976

[54] HARD-SURFACED SCREW CONVEYOR FOR CENTRIFUGES

[75] Inventor: Elwin J. Lewoczko, Lakeville, Mass.

[73] Assignee: Bird Machine Company, Inc., South Walpole, Mass.

[22] Filed: Dec. 16, 1974

[21] Appl. No.: 533,198

[52] U.S. Cl. .................. 198/213; 233/7; 403/355; 403/380; 403/381
[51] Int. Cl.² .......................... B65G 33/00
[58] Field of Search ........... 198/213; 209/451, 452; 210/369, 374; 233/7; 403/316, 355, 380, 381, 367

[56] References Cited
UNITED STATES PATENTS

| | | | |
|---|---|---|---|
| 1,284,752 | 11/1918 | Neuman | 403/381 |
| 2,415,033 | 1/1947 | Nygren | 403/355 |
| 2,434,935 | 1/1948 | Kroon | 403/355 |
| 3,123,187 | 3/1964 | Welsh | 403/316 |
| 3,216,219 | 11/1965 | Hoglund | 403/380 |
| 3,764,062 | 10/1973 | Brautigam | 233/7 |

FOREIGN PATENTS OR APPLICATIONS

| | | | |
|---|---|---|---|
| 36,323 | 1/1906 | Switzerland | 198/213 |

Primary Examiner—Evon C. Blunk
Assistant Examiner—Joseph E. Valenza
Attorney, Agent, or Firm—Edgar H. Kent

[57] ABSTRACT

A hard-surfaced screw conveyor for centrifuges has a helical metal blade with a plurality of wear-resisting segments mounted on one side thereof, there being mating parts on the opposed surfaces of the segments and the blade which are slidably interengaged to prevent radial outward and axial relative movements of the segments and the blade.

8 Claims, 4 Drawing Figures

U.S. Patent  Aug. 31, 1976  3,977,515
FIG 1
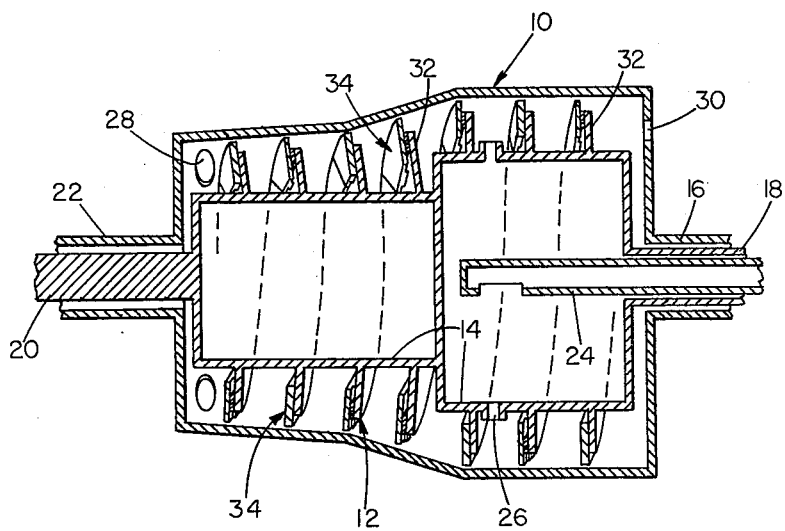
FIG 2
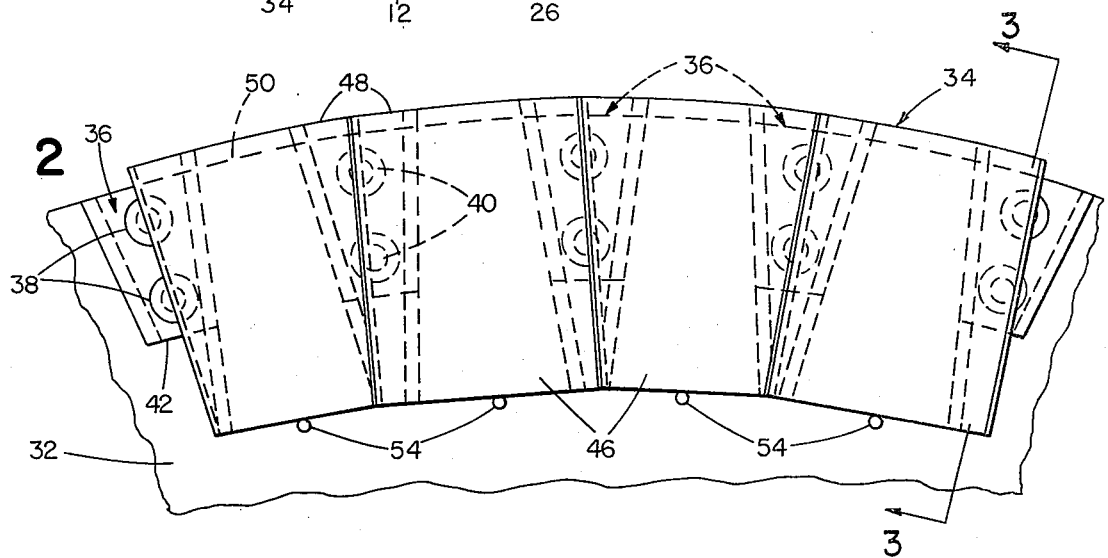
FIG 3
FIG 4
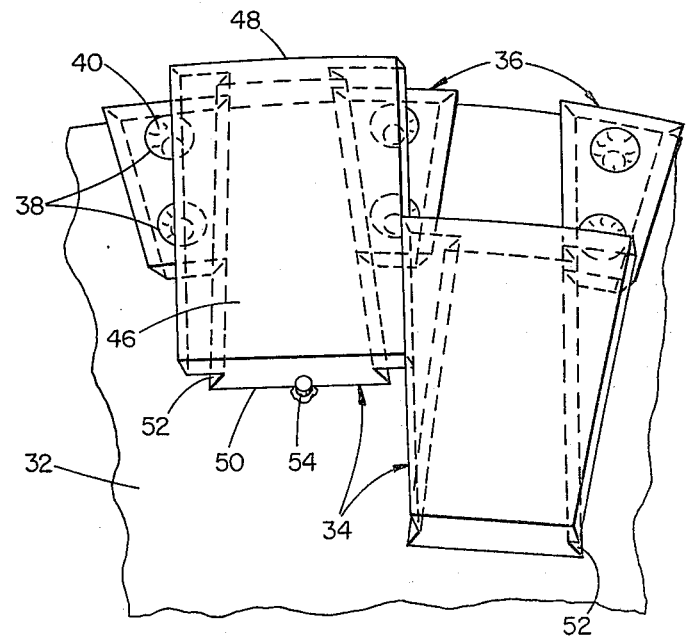

HARD-SURFACED SCREW CONVEYOR FOR CENTRIFUGES

BACKGROUND OF THE INVENTION

1. Field of the Invention

This invention relates to hard surfaced screw conveyors for centrifuges.

2. Description of the Prior Art

One of the principal maintenance problems with solids-liquid separating centrifuges has been due to wear of the helical conveyor blade by abrasive solids. Even though the conveyor blade be formed of hard wear steel alloys, abrasive solids, in some cases coupled with chemical attack, can cause such wear in the critical solids contacting area as intolerably to alter blade surface characteristics and clearance from the surrounding wall of the centrifuge bowl or basket. To save the expense of a new conveyor, it has been common practice to rebuild worn conveyors with hard surfacing materials to restore their requisite properties. However, this is a precision job, requiring special fixtures and often requiring return of the conveyor to the manufacturer for reworking, so that very considerable time and expense are involved.

To simplify conveyor blade renewal, conveyors have been made of a continuous helical steel blade to which are attached replaceable, contiguous, helical segments to form the working part of the conveyor. In one such construction, the segments have been steel alloy plates which are welded to the face and an end edge of the continuous blade. These segments are difficult to remove and difficult to replace, the latter requiring a conveyor gauge for accuracy of positioning. In addition, non-weldable, hard materials such as ceramics are more desirable in many cases. Segments of weldable or non-weldable materials have been bolted to the continuous blade to form its working area, but such attachment has not proved to be wholly satisfactory. Ceramic plates have been cemented in abutting relation to the face of the continuous blade, but suitable cements such as epoxy resin do not have sufficient strength to withstand radial forces at high gravities, and the cementing operation is difficult since the segments must be accurately held in position while the cement cures.

U.S. Pat. No. 3,764,062 discloses segments with a backing plate of weldable metal having a wear-resistant facing material bonded thereto by brazing, fusion or adhesive. The segments are attached in side-by-side relation to the continuous conveyor helix by welding along an edge portion overlying the face of the helix and along a second edge portion overlying the outer end face of the helix. Such segments are difficult to remove and replace in the field and the bonding of the facing material to the backing plate may not hold, particularly in high speed machines which develop high radial forces.

SUMMARY OF THE INVENTION

An object of the invention is to provide a wear-resistant screw conveyor for centrifuges in which the wear-resistant material is in the form of segments attached in side by side relation to a helical metal stub blade and in which bonding of said segments to the stub blade or a backing plate is not relied upon to hold the segments in place.

Another object is to provide such a conveyor in which the segments can be easily applied in initial manufacture and readily individually replaced in the field when worn. A further object is to provide such a conveyor wherein the segments are formed of non-weldable hard material such as a ceramic material.

In attaining the foregoing objects the invention provides a conveyor as aforesaid wherein the opposed surfaces of the segments and the conveyor stub blade are provided with mating parts which are releasably slidably interlocked to prevent movement of the segments relative to the conveyor stub blade in the radially outward, circumferential and axial directions. These are the directions in which strong forces are acting when the conveyor is in use. Movement of the segments radially inwardly of the blade is prevented by centrifugal force when the conveyor is operating. To prevent the segments from sliding inwardly when the conveyor is stopped, in the illustrated embodiment keepers are provided on the stub blade engaging the radially inner edge of the segments.

In preferred embodiments, the mating parts take the form of tongues and grooves which are arranged to extend outwardly of the conveyor axis at an angle such that their outer ends approach one another. In preferred embodiments also those mating parts on the blade are welded thereto and those on the segments are molded therein. In the illustrated embodiment, two sets of differently shaped segments are provided which are used in alternation to permit assembly of the segments to the stub blade by sliding them radially outwardly of the conveyor to interlock the mating parts, and to permit disassembly by reverse sliding thereof.

BRIEF DESCRIPTION OF THE DRAWINGS

In the drawings:

FIG. 1 is a partial longitudinal cross-section view, somewhat simplified, of a centrifuge and conveyor assembly, the conveyor being formed of a stub blade and segments assembled thereto according to the invention.

FIG. 2 is a fragmentary front elevation view of part of the conveyor of FIG. 1.

FIG. 3 is a cross-section view on line 3—3 of FIG. 2, looking in the direction of the arrows.

FIG. 4 is a view similar to FIG. 2 illustrating disassembly of the segments from the blade.

DESCRIPTION OF THE PREFERRED EMBODIMENTS

Centrifuges in which conveyors according to the invention are used may be of various types including solid bowl and perforate bowl continuous centrifuges, and combinations of the two. In FIG. 1 the centrifuge chosen for illustration has a solid bowl designated generally 10 surrounding a conveyor designated generally 12 mounted on a hollow hub 14. As is common, bowl 10 is cylindrical at one end and of frusto-conical diminishing cross-section at the other end, in this case there being an intermediate frusto-conical section of larger cone angle between the two. The bowl is rotated by means of a hollow shaft 16 at the cylindrical end, the drive connections (not shown) including support bearings and drive sheave and belt connections to a motor. The conveyor hub has at one end a hollow shaft 18 extending into shaft 16 and received in bearings (not shown), and at the other end has a shaft 20 extending through hollow shaft 22 on the bowl to differential drive connections (not shown) by which it is rotated in the same direction as the bowl at a small differential speed.

The feed slurry enters hub 14 through feed pipe 24 extending through shaft 18 and discharging into a feed compartment in the hub which in turn discharges it to the bowl through ports 26. The solids settling in the bowl under centrifugal force are moved by the conveyor to the smaller end of the bowl where they are discharged through ports 28 into a receiving compartment or chute in a stationary casing (not shown) surrounding the bowl. The liquid effluent is discharged from the bowl into the casing through ports 30 in the cylindrical end bowl head.

According to the invention, the conveyor 12 is made up of a helically pitched metal stub blade 32 welded to conveyor hub 14, the blade having larger than desired clearance from the surrounding bowl wall and, secured to the front face of blade 32, abutting segments of hard wear-resistant material designated generally 34 as hereinafter more particularly described. The conveyor is shown as a single composite blade which is completely formed of the composite of stub blade and segments. However, more than one composite conveyor blade may be used, and the composite blade structure of the invention may be used for only the part or parts of the conveyor blade or blades where high abrasive wear is experienced (e.g. toward the solids discharge end).

Referring to FIGS. 2 to 4 of the drawings, blade 32 has mounted on the radially outer part of its front face (in the direction of conveying) a plurality of axially spaced, wedge-shaped metal pieces designated generally 36, mounted thereon with their wider ends outwardly. Pieces 36 have a pair of openings 38 therethrough of frusto-conical shape with the smaller end toward blade 32, and the pieces are fastened to the blade by indented plug welds 40 to the blade and the sides of the openings 38 (see FIG. 3). The sides of pieces 36 slant inwardly from their outer faces as indicated at 42 to form with blade 32 slots, these facing slots of pairs of sucessive pieces 36 defining with blade 32 a single dovetail groove.

The segments, designated generally 34, have smooth front faces 46 and outer ends 48 both of which are curved to conform to the helical curvature of the front face and radially outer end respectively of stub blade 32. They are formed of a hard wearing material, preferably by molding commercially available ceramic material that is harder and more wear resistant than stainless steel. The under side of each segment is provided with a central projection 50 which is wedge-shaped, with the smaller end at the radially outer end 48 of the segment. The sides 52 of projections 50 are slanted outwardly oppositely and at a complementary angle to that of sides 42, so that sides 52 form tongues that fit slidably in the grooves defined between sides 42 of pieces 36 and blade 32. The width of projections 50 toward the radially outer end is such as to wedge sides 52 thereof tightly into these grooves formed by a pair of pieces 36 when the radially outer end 48 of each segment is in its desired position of slight projection beyond the radially outer end of stub blade 32, so that in this position the pieces 36, blade 32 and the projection 50 form a tight dovetail joint. Any looseness at this position can be adjusted by the addition of shims. The thinner portions of the segments at the sides of projection 50 overlie in part and are supported by the adjacent pieces 36.

It will be noted from FIGS. 2 and 4 that the segments forwardly of the projections 50 are of two different shapes which are used in alternation along the blade 32. One set of segments, shown as the second and fourth segments from the right in FIG. 2 and the righthand segment in FIG. 4, has its side edges slanting inwardly toward one another from the radially outer to the radially inner ends, so that these segments are wedge shaped. Each side of these segments is parallel to the side furthest away from it of its projection 50. The other set of segments, shown as the first and third from the right in FIG. 2 and the lefthand segment in FIG. 4, has its sides parallel so that it is of uniform width throughout its length, the sides being parallel to the longitudinal center line of the projection 50. The taper on the sides of the wedge-shaped segments is such that the space between the radial inner ends of a mounted pair is the same as that between their radial outer ends and just slightly larger than the width of the uniform width segments, so that the sides of adjacent segments abut when mounted. The provision of the differently shaped segments enables ready replacement of worn segments as hereinafter described.

In the initial manufacture of conveyors according to the invention, the pieces 36 are first properly located on the conveyor or stub blade and welded thereto by the described plug welds. The segments are then successively applied with the two shapes alternating by inserting the smaller ends of the projections 50 between the smaller ends of a pair of the pieces 36 and tapping the segment radially outwardly until the desired position is reached in which the tongues 52 at the sides of projections 50 are firmly wedged into the grooves at the sides of pieces 36. Preliminary to this operation, it may usually be desirable to spread a thin layer of a filler material on the blade areas that will underlie projection 50 or on the backs of projections 50, or both. Such a filler (not shown) compensates for surface irregularities that may occur in the blade and projection surface and insures a flush fit. If the filler is an adhesive such as an epoxy adhesive, the blade areas under the segments including pieces 36 should first be coated with a mold release to prevent bonding of the filler thereto, as bonding would seriously interfere with the desired ease of worn segment removal for replacement. Bonding of the segments to the blade is not needed, as the wedged together mating parts firmly retain the segments against radially outward or axial displacement, even under very high centrifugal force. As the final step, keepers such as pins 54 are welded to blade 32 in abutting relation with the radially inner ends of the segments to prevent them from sliding out when the centrifuge is stopped.

When wear necessitates replacement of segments, this can be readily accomplished in the field. One of the uniform width segments is first removed by chipping off its keeper and tapping it radially inwardly until it slides out from between the abutting segments, as it is free to do because its sides are parallel to the sides of the segments at either side of it. The segments at either side of the space so provided can then be sucessively removed in the same manner. As shown in FIG. 4, a wedge-shaped segment can be so removed after the removal of a uniform width segment at one side of it because its side abutting the side of the uniform width segment not removed is parallel to the far side 52 of its projection 50 which can slide along the groove formed by the piece 36 with which it is mated, the segment shifting laterally (to the right in FIG. 4) as it slides to maintain its side parallel to that of the segment remaining next to it. Since the pieces 36 remain in place, replacement of removed segments is a simple matter of repeating the segment assembly steps previously described.

I claim:

1. A hard surfaced screw conveyor for centrifuges comprising:

a helical metal blade mounted for rotation about the longitudinal axis of the helix and having radially disposed side surfaces extending to an end surface;

a plurality of wear resistant segments mounted on a surface of the blade, said segment and said blade surface provided with mating parts wedged together to mount said segments on said blade and to permit movement thereof only in the radially inward direction toward the blade axis;

keeper means retaining said segments against such radially inward movement; and said segments including a first set which are wider at their radially outer than their radially inner ends, and a second set intervening segments of said first set having a different shape with side edges parallel to the opposed side edges of the segments of said first set at opposite sides thereof, so that, upon removal of said keeper means, segments of said second set can be removed by sliding radially inwardly of said blade surface, and segments of said first set can be similarly removed after removal of a segment of said second set at one side thereof.

2. A conveyor according to claim 1 wherein said parts on said blade are welded thereto and said parts on said segments are molded therein.

3. A conveyor according to claim 2 wherein said segments are formed of ceramic material.

4. A conveyor according to claim 1 wherein said segments and said parts extend to the radially outer end of said blade.

5. A conveyor according to claim 1 wherein said parts comprise a pair of tongues and a pair of grooves extending generally radially outwardly of the conveyor axis at an angle to each other.

6. A conveyor according to claim 5 wherein said grooves are formed at the sides of wedge-shaped metal pieces welded to said conveyor.

7. A conveyor according to claim 6 wherein a said metal piece is disposed between each contiguous pair of said segments with its larger end disposed radially outwardly of said helix.

8. A conveyor according to claim 1 wherein said keeper means includes keepers attached to said blade at the inner ends of said segments.

* * * * *

UNITED STATES PATENT AND TRADEMARK OFFICE
CERTIFICATE OF CORRECTION

PATENT NO. : 3,977,515
DATED : August 31, 1976
INVENTOR(S) : Elwin J. Lewoczko

It is certified that error appears in the above-identified patent and that said Letters Patent are hereby corrected as shown below:

Col. 3, line 40, change "sucessive" to --successive--.

Col. 4, line 35, change "projection" to --projections--.

Col. 4, line 38, change "surface" to --surfaces--.

Col. 4, line 59, change "sucessively" to --successively--.

Col. 5, line 12, change "segment" to --segments--.

Signed and Sealed this

Ninth Day of November 1976

[SEAL]

Attest:

RUTH C. MASON
Attesting Officer

C. MARSHALL DANN
Commissioner of Patents and Trademarks